(12) United States Patent  (10) Patent No.: US 8,572,944 B2
Chillar et al.  (45) Date of Patent: Nov. 5, 2013

(54) PRIME MOVER FOR AN EXHAUST GAS RECIRCULATION SYSTEM

(75) Inventors: Rahul J. Chillar, Greenville, SC (US); Douglas S. Byrd, Greer, SC (US); Robert W. Taylor, Ponte Vedra Beach, FL (US); Joell R. Hibshman, II, Greer, SC (US)

(73) Assignee: General Electric Company, Schenectady, NY (US)

( * ) Notice: Subject to any disclaimer, the term of this patent is extended or adjusted under 35 U.S.C. 154(b) by 989 days.

(21) Appl. No.: 11/960,198

(22) Filed: Dec. 19, 2007

(65) Prior Publication Data

US 2009/0158735 A1 Jun. 25, 2009

(51) Int. Cl.
*F02C 3/34* (2006.01)

(52) U.S. Cl.
USPC .............................. 60/39.52; 60/772

(58) Field of Classification Search
USPC ................................... 60/39.52, 772
See application file for complete search history.

(56) References Cited

U.S. PATENT DOCUMENTS

| | | | |
|---|---|---|---|
| 3,785,145 A * | 1/1974 | Amann | 60/39.24 |
| 4,133,171 A * | 1/1979 | Earnest et al. | 60/39.182 |
| 4,256,468 A * | 3/1981 | Mazer et al. | 95/65 |
| 4,434,613 A * | 3/1984 | Stahl | 60/784 |
| 6,250,080 B1 * | 6/2001 | Shelor et al. | 60/618 |
| 6,598,402 B2 * | 7/2003 | Kataoka et al. | 60/775 |
| 6,910,335 B2 * | 6/2005 | Viteri et al. | 60/786 |
| 7,007,487 B2 * | 3/2006 | Belokon et al. | 60/777 |
| 2005/0076645 A1 * | 4/2005 | Frutschi et al. | 60/772 |
| 2006/0272334 A1 * | 12/2006 | Pranda et al. | 60/783 |
| 2007/0227118 A1 * | 10/2007 | Hu et al. | 60/39.182 |

FOREIGN PATENT DOCUMENTS

| | | |
|---|---|---|
| CN | 1207453 A | 2/1999 |
| JP | 06-058169 A | 3/1994 |
| JP | 08-254160 A | 10/1996 |
| JP | 2000-064854 A | 2/2000 |
| JP | 2002-332919 A | 11/2002 |
| JP | 2003-505642 A | 2/2003 |
| JP | 2004-360694 A | 12/2004 |
| JP | 2005-023900 A | 1/2005 |
| JP | 2006-009714 A | 1/2006 |
| JP | 2007-278110 A | 10/2007 |
| JP | 2007-303381 A | 11/2007 |

OTHER PUBLICATIONS

Office Action issued in connection with CN Application No. 200810103978.0, Jul. 23, 2012.
Notice of Reasons for Refusal issued in connection with JP Application No. 2008-320359, Feb. 21, 2013.

* cited by examiner

*Primary Examiner* — Phutthiwat Wongwian
*Assistant Examiner* — Michael B Mantyla
(74) *Attorney, Agent, or Firm* — Fletcher Yoder P.C.

(57) ABSTRACT

A portion of the exhaust generated by a turbomachine is recirculated through an inlet portion by an exhaust gas recirculation system. The system reduces the level of constituents within the exhaust before the exhaust is recirculated. The turbomachine may be utilized to drive the exhaust gas through the system.

14 Claims, 4 Drawing Sheets

PRIME MOVER FOR AN EXHAUST GAS RECIRCULATION SYSTEM

This application is related to commonly-assigned U.S. patent application Ser. No. 11/928,038, filed Oct. 30, 2007; U.S. patent application Ser. No. 11/953,524, filed Dec. 10, 2007; and U.S. patent application Ser. No. 11/936,996, filed Nov. 8, 2007.

BACKGROUND OF THE INVENTION

The present invention relates to the exhaust gas emitted from a turbomachine, and more particularly to a system and method of utilizing a turbomachine as a prime mover of the exhaust gas recirculated within an EGR system.

There is a growing concern over the long-term effects of Nitrogen Oxides (hereinafter NOx) and Carbon Dioxide (hereinafter "$CO_2$") and Sulfur Oxides (SOx) emissions on the environment. The allowable levels of emissions that may be emitted by a turbomachine, such as a gas turbine, are heavily regulated. Operators of turbomachines desire methods of reducing the levels of NOx, $CO_2$ and SOx emitted.

Significant amounts of condensable vapors exist in the exhaust gas stream. These vapors usually contain a variety of constituents such as water, acids, aldehydes, hydrocarbons, sulfur oxides, and chlorine compounds. Left untreated, these constituents will accelerate corrosion and fouling of the internal components if allowed to enter the turbomachine.

Exhaust gas recirculation (EGR) generally involves recirculating a portion of the emitted exhaust through an inlet portion of the turbomachine. The exhaust is then mixed with the incoming airflow prior to combustion. The EGR process facilitates the removal and sequestration of concentrated $CO_2$, and may also reduce the NOx and SOx emission levels.

There are a few concerns with the currently known EGR systems. Some EGR systems incorporate a fan or blower to drive the recirculated exhaust throughout the EGR system. The fan or blower requires additional costs, maintenance, generates noise, and will require damping.

For the foregoing reasons, there is a need for a system and method of driving the recirculated exhaust throughout an EGR system. The system and method should not require a fan or blower to drive the exhaust throughout the EGR system.

BRIEF DESCRIPTION OF THE INVENTION

In accordance with an embodiment of the present invention, a system for reducing constituents within an exhaust stream generated by a turbomachine comprising an inlet section, a compressor section, and an exhaust section; the system comprising: at least one exhaust gas recirculation (EGR) system comprising at least one EGR skid; wherein the at least one EGR skid can: receive the at least one exhaust stream at a first temperature from the exhaust section of the at least one turbomachine; receive the exhaust stream comprising constituents at a first level; reduce the constituents to a second level; and allow the exhaust stream to exit at a second temperature; and wherein the at least one EGR system recirculates the exhaust stream exiting the at least one EGR skid to the inlet section; and wherein the turbomachine drives the exhaust stream through the EGR system.

In accordance with an embodiment of the present invention, a method of reducing constituents within an exhaust stream of a turbomachine comprising an inlet section, a compressor section, and an exhaust section; the system comprising: providing at least one exhaust gas recirculation (EGR) system comprising at least one EGR skid; receiving the exhaust stream at a first temperature from the exhaust section of the at least one turbomachine; receiving the at least one exhaust stream comprising constituents at a first level; reducing the constituents to a second level; and allowing for the exhaust stream to exit at a second temperature; and recirculating the at least one exhaust stream exiting the at least one EGR skid to the inlet section; and wherein the turbomachine drives the exhaust stream through the EGR system.

DETAILED DESCRIPTION OF THE INVENTION

Figure 1:
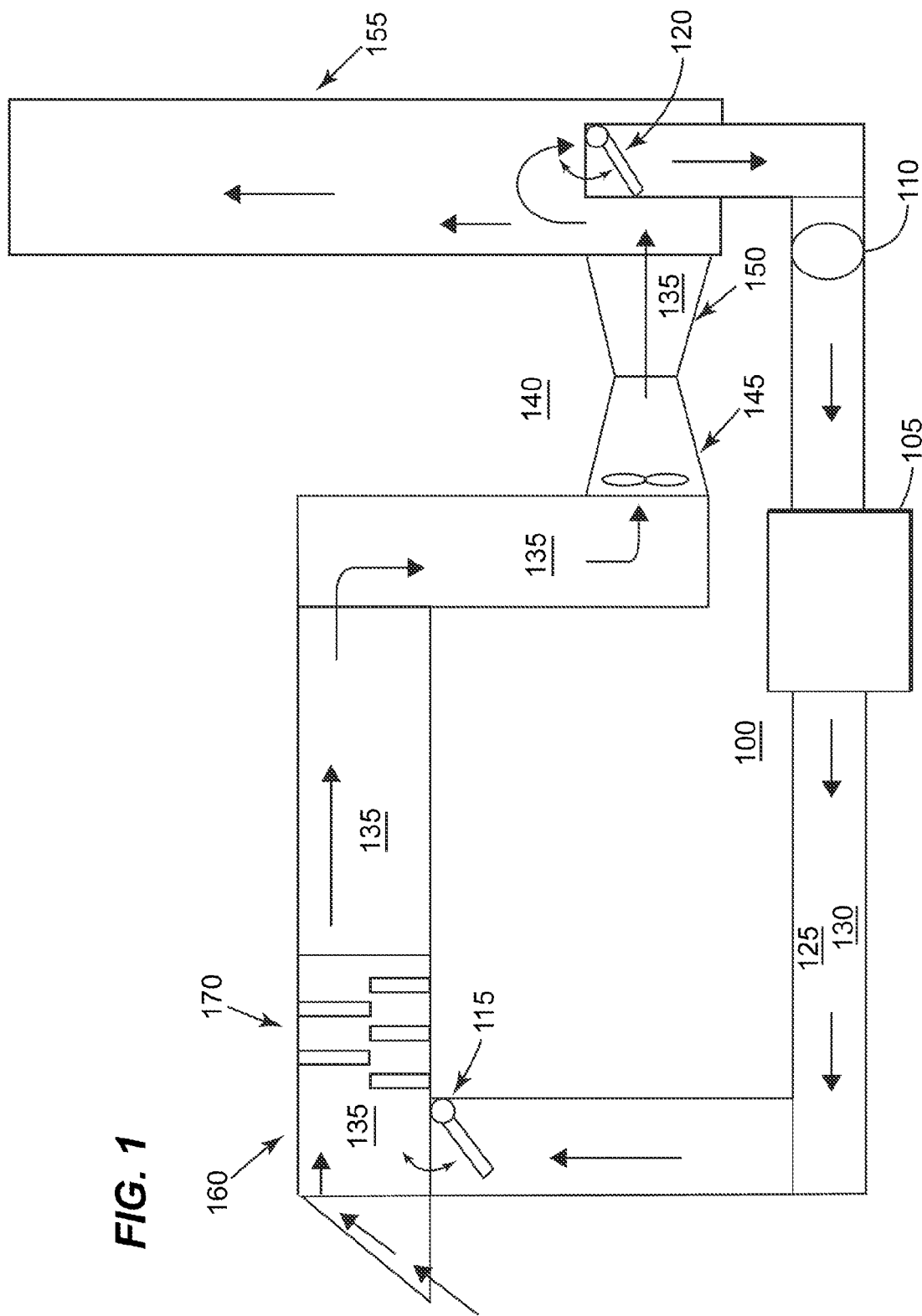
FIG. 1 is a schematic illustrating an example of an exhaust gas recirculation system integrated with a turbomachine.

The following detailed description of preferred embodiments refers to the accompanying drawings, which illustrate specific embodiments of the invention. Other embodiments having different structures and operations do not depart from the scope of the present invention.

Certain terminology is used herein for the convenience of the reader only and is not to be taken as a limitation on the scope of the invention. For example, words such as "upper," "lower," "left," "right," "front", "rear" "top", "bottom" "horizontal," "vertical," "upstream," "downstream," "fore", "aft", and the like; merely describe the configuration shown in the Figures. Indeed, the element or elements of an embodiment of the present invention may be oriented in any direction and the terminology, therefore, should be understood as encompassing such variations unless specified otherwise.

An embodiment of the present invention takes the form of a system that may recirculate a portion of the exhaust of at least one turbomachine where it may be mixed with the inlet air and re-enter the turbomachine without affecting reliability and availability of the unit.

Generally, the exhaust gas recirculation system of an embodiment of the present invention comprises multiple elements. The configuration and sequence of the elements may be dictated by the composition of the exhaust gas. In general the steps comprising the exhaust gas re-circulation process are: cooling, scrubbing, de-misting, high efficiency particulate and droplet removal, and mixing. When the present invention is utilized, the diverted gas, blended with inlet air, can be introduced to the turbine inlet without harm. As described below, there are multiple arrangements that may be used to accomplish the exhaust gas treatment.

The present invention has the technical effect of utilizing a turbomachine to drive and/or draw a recirculated exhaust (hereinafter "exhaust stream") through an EGR system that reduces the levels of the aforementioned constituents, which may be within the exhaust stream. These levels may be reduced from a first level to a second level. An embodiment of the present invention may also allow for the removal and sequestration of concentrated $CO_2$ emissions.

The present invention may be applied to the variety of turbomachines that produce a gaseous fluid, such as, but not limiting of, a heavy duty gas turbine: an aero-derivative gas turbine; or the like (hereinafter referred to as "gas turbine"). An embodiment of the present invention may be applied to either a single gas turbine or a plurality of gas turbines. An embodiment of the present invention may be applied to a gas turbine operating in a simple cycle or a combined cycle configuration.

As described below, an embodiment of the present invention may include at least one EGR skid. The at least one EGR skid may utilize at least one scrubber; or at least one scrubber and at least one downstream heat exchanger; or at least one scrubber and at least one upstream heat exchanger; or at least one scrubber, at least one downstream heat exchanger; and at least one upstream heat exchanger; or various combinations thereof. Moreover, the at least one EGR skid may also include an injector that may introduce a reagent for reducing the level of harmful constituents within the exhaust stream; and a wet electrostatic precipitator for removing the constituents.

The elements of the present invention may be fabricated of any material that can withstand the operating environment under which the EGR system may function and operate.

Referring now to the Figures, where the various numbers represent like elements throughout the several views, FIG. 1 is a schematic illustrating an example of an exhaust gas recirculation system integrated with a turbomachine 140. FIG. 1 illustrates a turbomachine 140 and an EGR system 100.

The turbomachine 140 generally comprises a compressor section 145 integrated with an exhaust section 150. An inlet section 160 may be located upstream of the compressor section 145 and may include a mixing station 170. An exhaust stack 155 may be located downstream of the exhaust section 150.

The EGR system 100, comprises: an EGR skid 105; an EGR fan (or blower) 110; an EGR inlet damper 115; and an EGR exhaust damper 120, which may be integrated with an exhaust section 150 of the turbomachine 140.

The at least one EGR system 100 may be of a size and fabricated of a material capable of withstanding the physical properties of the exhaust stream 125, such as, but not limiting of, a flowrate of about 10,000 Lb/hr to about 50,000,000 Lb/hr and a temperature up to about 1500 Degrees Fahrenheit. The inlet section 160 and the exhaust section 150 may bound the flow path 130 of the EGR system 100.

The EGR skid 105 generally includes the component(s) of the EGR system 100 that reduces the level of aforementioned constituents from the exhaust stream 125. These component(s) may include for example, but not limiting of, at least one heat exchanger, at least one scrubber, at least one demister, or similar components, (none of which are illustrated in the Figures). The EGR fan 110 may circulate the exhaust during the operation of the EGR system 100.

Generally, during the operation of the EGR system 100, the EGR exhaust damper 120 may open to allow for the exhaust stream 125 from the exhaust section 150 to enter the EGR system 100. The exhaust damper 120 may apportion the total exhaust flow between a non-recirculated exhaust and the exhaust stream 125. Then, the EGR skid 105 may reduce the level of constituents within the exhaust stream 125. Next, the EGR inlet damper 115 may open to allow for the recirculated exhaust stream 125 to enter the inlet section 160 of the turbomachine 140. The exhaust stream 125 may then mix with the inlet air within the mixing station 170, forming an inlet fluid 135. The inlet fluid 135 may then flow downstream of the mixing station 170 to the compressor section 145 of the turbomachine 140. During the aforementioned process, the EGR fan 110 operates to drive the exhaust stream 125 throughout the EGR system 100.

Incorporating an EGR fan 110 into the EGR system 100 may cause a few concerns. An EGR fan 110 may increase the overall hardware and maintenance costs of the EGR system 100. An EGR fan 110 may require sound insulation due to the level of noise that may be generated during operation. An EGR fan 110 may require damping to reduce vibration. An EGR fan 110 may also require relatively large EGR system 100 structures. Also, an EGR fan 110 may increase the complexity of the control system operating the EGR system 100. The EGR fan 111 typically requires energy, which increases the operating costs of the EGR system 100.

Figure 2:
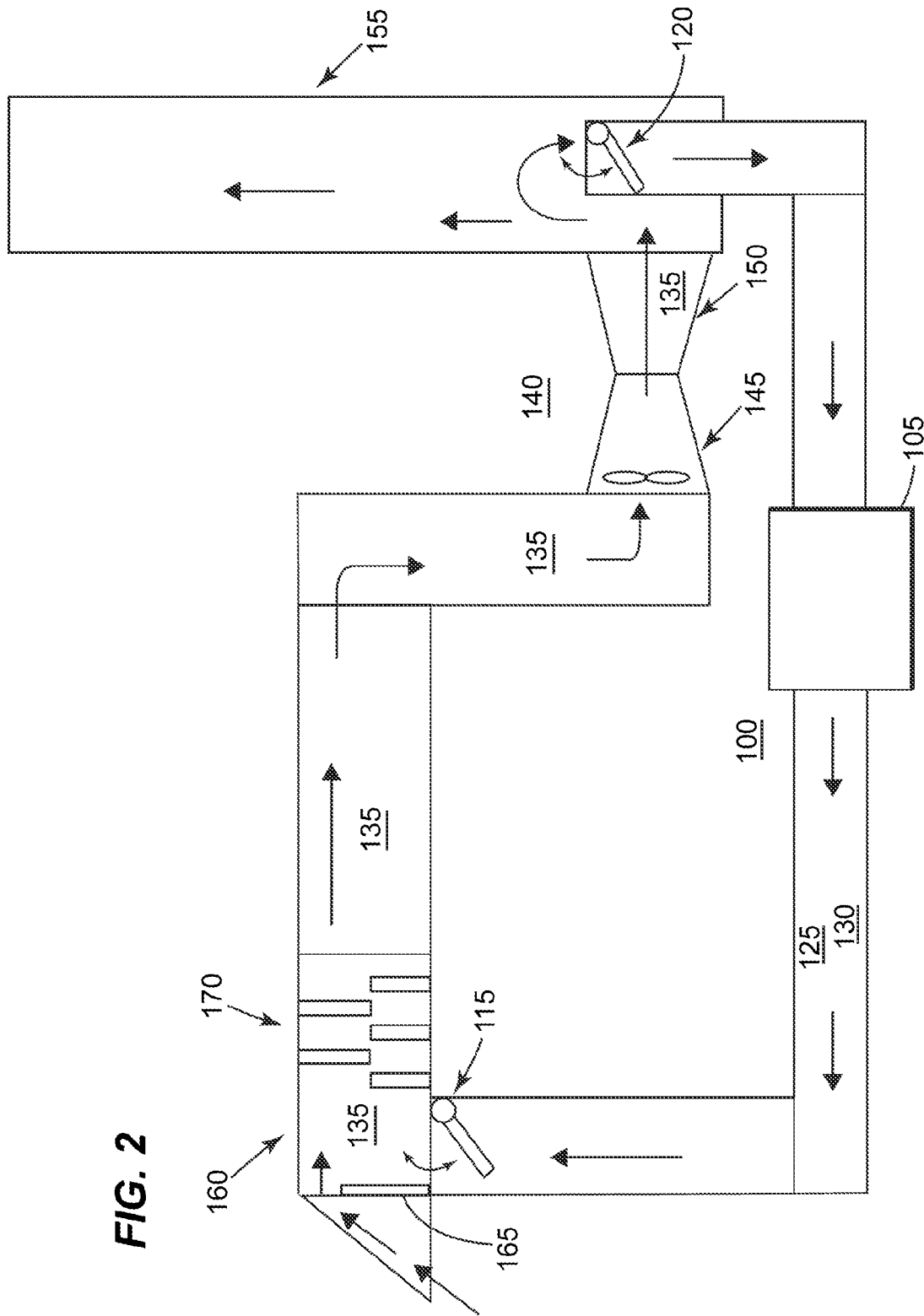
FIG. 2 is a schematic illustrating an example of an exhaust gas recirculation integrated with a turbomachine in accordance with a first embodiment of the present invention.

Referring now to FIG. 2, which is a schematic illustrating an example of an exhaust gas recirculation integrated with a turbomachine 140 in accordance with a first embodiment of the present invention. FIG. 2 illustrates a turbomachine 140 and an EGR system 100.

The turbomachine 140, in this first embodiment of the present invention, generally includes: a compressor section 145 integrated with an exhaust section 150; an inlet section 160, which may be located upstream of the compressor section 145; and an exhaust stack 155 may be located downstream of the exhaust section 150.

The compressor section 145 may include a fixed flow restrictor 165, and a mixing station 170. The fixed flow restrictor 165 may restrict the flow of the inlet air entering the inlet section 160. The fixed flow restrictor 165 may be of a size and material capable of withstanding the operating environment of the turbomachine 140 and EGR system 100. The fixed flow restrictor 165 may be incorporated, for example, but not limiting of, during a retrofit application of the turbomachine 140.

The EGR system 100, in this first embodiment of the present invention, may include: an EGR skid 105; an EGR inlet damper 115; and an EGR exhaust damper 120, which may be integrated with an exhaust section 150 of the turbomachine 140. The EGR exhaust damper 120 may modulate to control the flow of the exhaust stream 125 entering the EGR system 100. This first embodiment of the EGR system 100 does not require an EGR fan 110 to drive the exhaust stream 125. Here, the suction effect provided by the compressor section 145 may drive the exhaust stream 125 through the EGR system 100 and into the inlet section 160.

In use, the EGR system 100 of this first embodiment of the present invention, as illustrated in FIG. 1, functions while the turbomachine 140 is in operation. The EGR exhaust damper 120 may modulate to allow for the exhaust stream 125 from the exhaust section 150 to enter the EGR system 100. The EGR exhaust damper 120 may apportion the total exhaust flow between a non-recirculated exhaust and the exhaust stream 125, as discussed. The fixed flow restrictor 165 and the EGR exhaust damper 120 may operate to balance the flow of the exhaust stream 125 within the EGR system 100 and the turbomachine 140. This may be accomplished by adjusting the position of the EGR exhaust damper 120 during the operation of the EGR system 100.

Next, the EGR skid 105 may reduce the level of constituents within the exhaust stream 125. The EGR inlet damper 115 may open to allow for the recirculated exhaust stream 125 to enter the inlet section 160 of the turbomachine 140. The exhaust stream 125 may then mix with the inlet air within the mixing station 170, forming an inlet fluid 135. The inlet fluid 135 may then flow downstream of the mixing station 170 to the compressor section 145 of the turbomachine 140. During the operation of this first embodiment of the present invention the aforementioned concerns associated with the EGR fan 110 are not present.

Figure 3:
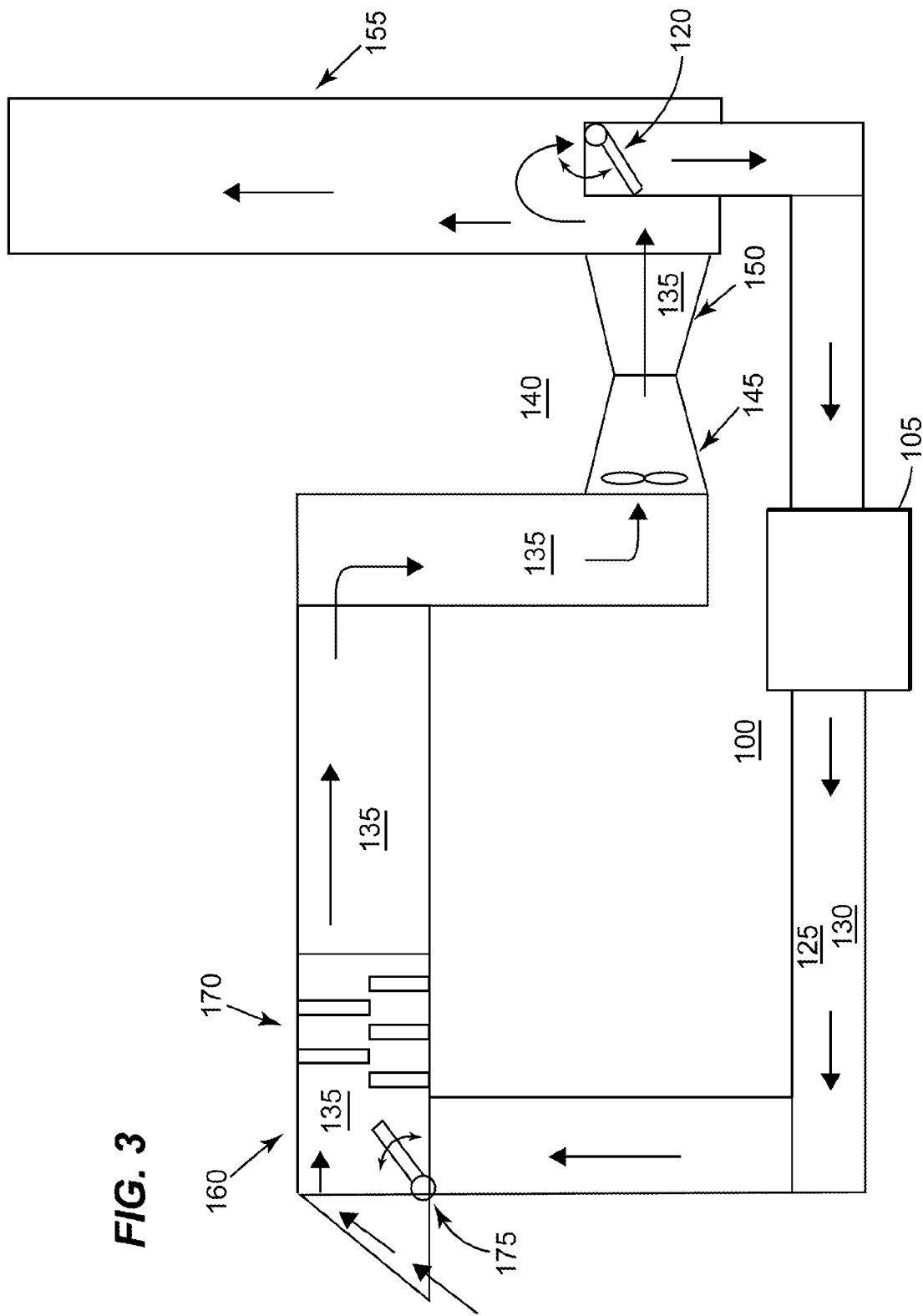
FIG. 3 is a schematic illustrating an example of an exhaust gas recirculation integrated with a turbomachine in accordance with a second embodiment of the present invention.

Referring now to FIG. 3, which is a schematic illustrating an example of an exhaust gas recirculation integrated with a turbomachine 140 in accordance with a second embodiment of the present invention. FIG. 3 illustrates a turbomachine 140 and an EGR system 100.

The turbomachine 140, in this second embodiment of the present invention, generally includes: a compressor section 145 integrated with an exhaust section 150; an inlet section 160, which may be located upstream of the compressor section 145; and an exhaust stack 155 may be located downstream of the exhaust section 150.

The compressor section 145 may include a movable flow restrictor 175, and a mixing station 170. In a first position the movable flow restrictor 175 may maximizes the flow of inlet air into the inlet section 160 and may minimize the flow of the exhaust stream 125 into the inlet section 160. In a second position the movable flow restrictor 175 may minimize the flow of inlet air into the inlet section 160 and may maximize the flow of the exhaust stream 125 into the inlet section 160. The movable flow restrictor 175 may also be positioned in a plurality of intermediate positions between the first position and the section position to modulate the relative bias between inlet air and the exhaust stream 125 entering the inlet section 160. The movable flow restrictor 175 may be of a size and material capable of withstanding the operating environment of the turbomachine 140 and EGR system 100.

The EGR system 100, in this second embodiment of the present invention, may include: an EGR skid 105; and an EGR exhaust damper 120, which may be integrated with an exhaust section 150 of the turbomachine 140. The EGR exhaust damper 120 may modulate to control the flow of the exhaust stream 125 entering the EGR system 100. Furthermore, the EGR exhaust damper 120 may serve to isolate the EGR system 100, which not in use.

This second embodiment of the EGR system 100 does not require an EGR fan 110 to drive the exhaust stream 125. Here, the suction effect provided by the compressor section 145 may drive the exhaust stream 125 through the EGR system 100 and into the inlet section 160. Furthermore, the exhaust stream 125 may exit the exhaust section 150 at a pressure allowing for the exhaust stream 125 to flow through the EGR system 100.

In use, the EGR system 100 of this second embodiment of the present invention, as illustrated in FIG. 2, functions while the turbomachine 140 is in operation. The EGR exhaust damper 120 may modulate to allow for the exhaust stream 125 from the exhaust section 150 to enter the EGR system 100. The EGR exhaust damper 120 may apportion the total exhaust flow between a non-recirculated exhaust and the exhaust stream 125, as discussed.

The movable flow restrictor 175 and the EGR exhaust damper 120 may operate to balance the flow of the exhaust stream 125 within the EGR system 100 and the turbomachine 140. This may be accomplished by adjusting the position of the EGR exhaust damper 120 during the operation of the EGR system 100.

Furthermore, the movable flow restrictor 175 may be modulated to allow full flow of the inlet air into the inlet section 160. This feature may be useful when for example, but not limiting of, the turbomachine 140 operates when the EGR system 100 is not in use.

Next, the EGR skid 105 may reduce the level of constituents within the exhaust stream 125. The EGR inlet damper 115 may open to allow for the recirculated exhaust stream 125 to enter the inlet section 160 of the turbomachine 140. The exhaust stream 125 may then mix with the inlet air within the mixing station 170, forming an inlet fluid 135. The inlet fluid 135 may then flow downstream of the mixing station 170 to the compressor section 145 of the turbomachine 140. During the operation of this second embodiment of the present invention the aforementioned concerns associated with the EGR fan 110 are not present.

Figure 4:
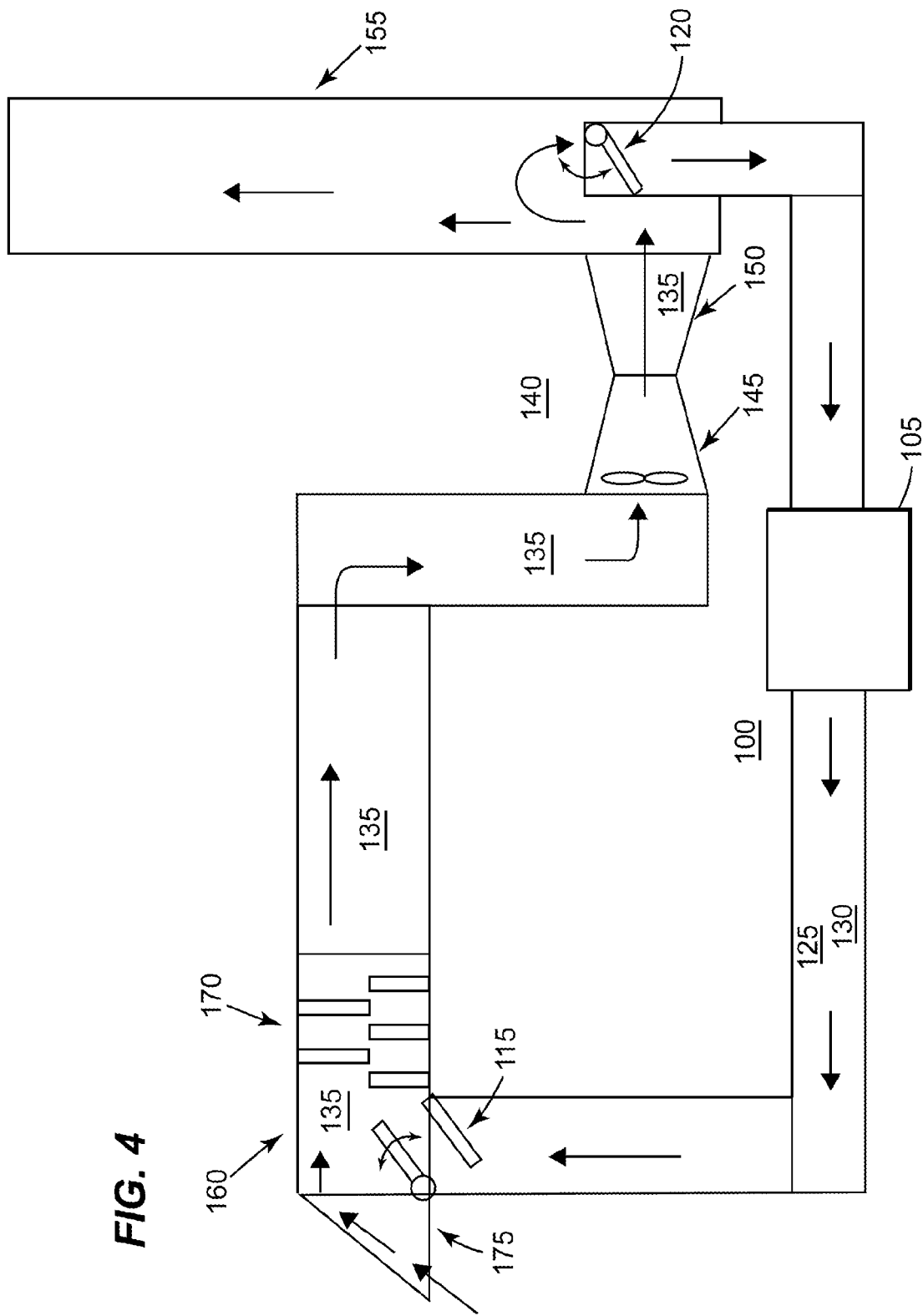
FIG. 4 is a schematic illustrating an example of an exhaust gas recirculation integrated with a turbomachine in accordance with a third embodiment of the present invention.

Referring now to FIG. 4, which is a schematic illustrating an example of an exhaust gas recirculation integrated with a turbomachine in accordance with a third embodiment of the present invention. FIG. 4 illustrates a turbomachine 140 and an EGR system 100.

The turbomachine 140, in this third embodiment of the present invention, generally includes: a compressor section 145 integrated with an exhaust section 150; an inlet section 160, which may be located upstream of the compressor section 145; and an exhaust stack 155 may be located downstream of the exhaust section 150.

The compressor section 145 may include a movable flow restrictor 175, and a mixing station 170. The movable flow restrictor 175 may modulate to restrict the flow of a portion of the inlet air entering the inlet section 160. The movable flow restrictor 175 may be of a size and material capable of withstanding the operating environment of the turbomachine 140 and EGR system 100.

The EGR system 100, in this third embodiment of the present invention, may include: an EGR skid 105; an EGR inlet damper 115; and an EGR exhaust damper 120, which may be integrated with an exhaust section 150 of the turbomachine 140. The EGR exhaust damper 120 may modulate to control the flow of the exhaust stream 125 entering the EGR system 100. Furthermore, the EGR exhaust damper 120 may serve to isolate the EGR system 100, which not in use.

This third embodiment of the EGR system 100 does not require an EGR fan 110 to drive the exhaust stream 125. Here, the suction effect provided by the compressor section 145 may draw the exhaust stream 125 through the EGR system 100 and into the inlet section 160. Furthermore, the exhaust stream 125 may exit the exhaust section 150 at a pressure allowing for the exhaust stream 125 to flow through the EGR system 100.

In use, the EGR system 100 of this third embodiment of the present invention, as illustrated in FIG. 3, functions while the turbomachine 140 is in operation. The EGR exhaust damper 120 may modulate to allow for the exhaust stream 125 from the exhaust section 150 to enter the EGR system 100. The EGR exhaust damper 120 may apportion the total exhaust flow between a non-recirculated exhaust and the exhaust stream 125, as discussed.

The movable flow restrictor 175 and the EGR exhaust damper 120 may operate to maintain balance the flow of the exhaust stream 125 within the EGR system 100 and the turbomachine 140. This may be accomplished by adjusting the position of the EGR exhaust damper 120 during the operation of the EGR system 100.

Furthermore, the movable flow restrictor 175 may be modulated to allow full flow of the inlet air into the inlet section 160. This feature may be useful when for example, but not limiting of, the turbomachine 140 operates when the EGR system 100 is not in use.

Next, the EGR skid 105 may reduce the level of constituents within the exhaust stream 125. The EGR inlet damper 115 may open to allow for the recirculated exhaust stream 125 to enter the inlet section 160 of the turbomachine 140. The exhaust stream 125 may then mix with the inlet air within the mixing station 170, forming an inlet fluid 135. The inlet fluid 135 may then flow downstream of the mixing station 170 to the compressor section 145 of the turbomachine 140. During the operation of this third embodiment of the present invention the aforementioned concerns associated with the EGR fan 110 are not present.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, it should be appreciated that any arrangement, which is calculated to achieve the same purpose, may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A system comprising:
   a turbomachine comprising: an inlet section having an air intake and an exhaust stream intake, a compressor section, and an exhaust section;
   an exhaust gas recirculation (EGR) system fluidly connecting a downstream end of the exhaust section and the inlet section in a manner that allows a portion of an exhaust stream to enter the inlet section, wherein the EGR system comprises:
      an EGR skid fluidly located in a flowpath of the EGR system, wherein the EGR skid comprises one or more fluid treatment systems; and
      an EGR exhaust damper connected near an inlet portion of the EGR system and near an exhaust stack, such that the EGR exhaust damper comprises a movable structure that divides the exhaust stream exiting the exhaust section into the portion that enters the inlet section and a portion of the exhaust stream that discharges through the exhaust stack; and
   a fixed flow restrictor positioned at the inlet section having the air intake and the exhaust stream intake, wherein the fixed flow restrictor restricts a flow of an inlet air entering the compressor section via the air intake; and
   a movable flow restrictor positioned within the inlet section, wherein the movable flow restrictor is configured to adjust the flow of the exhaust stream entering the compressor section when the fixed flow restrictor restricts the flow of the inlet air entering the compressor section.

2. The system of claim 1, wherein the movable flow restrictor comprises an EGR inlet damper.

3. The system of claim 1, wherein the fixed flow restrictor is located within the inlet section at the air intake.

4. The system of claim 1, wherein the fixed flow restrictor and the EGR exhaust damper operate to balance the flow of the exhaust stream within the EGR system.

5. The system of claim 1, wherein the movable flow restrictor is located upstream of the compressor.

6. The system of claim 1, wherein the movable flow restrictor controls the flow of the inlet air entering the inlet section.

7. The system of claim 1, wherein the movable flow restrictor and the EGR exhaust damper operate to balance the flow of the exhaust stream within the EGR system.

8. The system of claim 1, wherein a pressure drop between the EGR exhaust damper and the fixed flow restrictor supports an operation of the compressor section in driving the portion of the exhaust stream through the EGR system.

9. The system of claim 1, wherein the turbomachine is in a simple cycle configuration.

10. A method of reducing constituents within an exhaust stream of a turbomachine comprising an inlet section, a compressor section, and an exhaust section;
   the method comprising:
      operating at least one exhaust gas recirculation (EGR) system comprising at least one EGR skid fluidly located downstream of the exhaust section and integrated with an exhaust stack; wherein the at least one EGR skid comprises one or more fluid treatment vessels and operatively performs the following operations:
         receiving an exhaust stream from the exhaust section at a first temperature; wherein the exhaust stream comprises constituents at a first level;
         operating the one or more fluid treatment vessels to reduce the constituents to a second level; and
         discharging the exhaust stream at a second temperature to the inlet section; wherein the second temperature is lower than the first temperature; and
      operating the turbomachine to move the exhaust stream through the EGR system by:
         opening a movable EGR exhaust damper to allow some of the exhaust stream to enter the EGR system;
         restricting an inlet air flow and an exhaust flow to the compressor section with a movable flow restrictor that is located within the inlet section, wherein the inlet section comprises an air intake and an exhaust intake, the movable flow restrictor and the movable EGR exhaust damper determine a pressure drop across the EGR system, and the movable flow restrictor maximizes the inlet air flow and minimizes the exhaust flow to the compressor section in a first position, and minimizes the inlet air flow and maximizes the exhaust flow to the compressor section in a second position, and the movable flow restrictor is movable between the first and second positions.

11. The method of claim 10, further comprising:
   utilizing the EGR exhaust damper to modulate a flow of the exhaust stream entering the EGR system.

12. The method of claim 10, further comprising:
   utilizing the EGR exhaust damper to modulate the flow of the exhaust stream entering the EGR system;
   utilizing the movable flow restrictor to modulate the flow of the inlet air entering the inlet section; and
   wherein the movable flow restrictor and the EGR exhaust damper balance the flow of the exhaust stream within the EGR system.

13. A system, comprising:
   a turbomachine, comprising:
      an inlet section having an air intake and an exhaust intake;
      a compressor section disposed downstream of the inlet section; and
      an exhaust section disposed downstream of the compressor section; and
   an exhaust gas recirculation (EGR) system coupled to the turbomachine, comprising:
      an exhaust flow path fluidly coupling the exhaust section and the inlet section, wherein the exhaust flow path comprises a discharge end configured to discharge a first portion of an exhaust stream into the inlet section at the exhaust intake; and an EGR skid fluidly located in a flowpath of the EGR system, wherein the EGR skid comprises one or more fluid treatment systems; and a movable flow restrictor disposed within the inlet section of the turbomachine, and wherein the movable flow restrictor is movable between first and second positions to bias a flow of inlet air and a flow of the first portion of the exhaust stream into the compressor section such that the movable flow restrictor maximizes the flow of inlet air into the compressor section and minimizes the flow of the exhaust stream into the compressor section in the first position, and minimizes the flow of inlet air into the compressor section and maximizes the flow of the exhaust stream into the compressor section in the second position.

14. The system of claim 13, wherein the EGR system comprises a movable EGR exhaust damper disposed near an exhaust inlet portion of the exhaust flow path and near an exhaust stack, wherein that the EGR exhaust damper divides the exhaust stream exiting the exhaust section into the first portion that enters the inlet section and a second portion of the exhaust stream that discharges through the exhaust stack, and the turbomachine is the prime mover of the exhaust stream through the exhaust flow path.

\* \* \* \* \*